United States Patent Office 2,955,141
Patented Oct. 4, 1960

2,955,141

CONDENSATION OF POLYHALOCYCLOALKA-DIENES WITH NON-CONJUGATED CYCLO-ALKADIENES

Louis Schmerling, Riverside, Ill., assignor, by mesne assignments, to Universal Oil Products Company, Des Plaines, Ill., a corporation of Delaware No Drawing. Filed Jan. 31, 1958, Ser. No. 712,332

19 Claims. (Cl. 260—648)

This application is a continuation-in-part of my copending application Serial No. 455,088, filed September 9, 1954, now abandoned.

This invention relates to new compositions of matter prepared by reacting a conjugated polyhalocycloalkadiene with a non-conjugated cycloalkadiene, and more particularly to new compositions of matter such as may be prepared by condensing hexachlorocyclopentadiene with 1,4-cyclohexadiene or alkyl- or halo-substituted 1,4-cyclohexadienes.

Heretofore it has been known that certain unsaturated cyclic compounds such as cyclopentenes, or cyclopentene derivatives will act as dienophiles and will undergo a Diels-Alder type reaction while other unsaturated cyclic compounds such as cyclohexene, or derivatives thereof do not act as dienophiles. This fact has been borne out in many instances by researchers who have established a conspicuous difference in behaviour between cyclohexenes and cyclopentenes (for example, see R. C. Fuson, Advanced Organic Chemistry, Wiley and Sons, Inc., 1950, page 63). It is also known in the prior art that a compound such as bicycloheptadiene will undergo reaction with a chlorinated cycloalkadiene to form the corresponding tetracyclic compound. However, the double bonds in the bicycloheptadiene are each in a cyclopentene ring system, a strained ring system which undergoes a Diels-Alder reaction quite readily when reacted with hexachlorocyclopentadiene. This position of the double bonds in the bicycloheptadiene is illustrated by the structural formula of bicycloheptadiene:

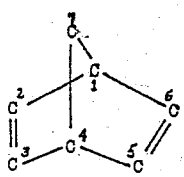

As is seen from this formula, carbon atoms 1, 2, 3, 4 and 7 form one cyclopentene ring while carbon atoms 1, 4, 5, 6 and 7 form the second cyclopentene ring. In contrast to the double bonds in the bicycloheptadiene rings the two double bonds in a non-conjugated cyclohexadiene are similar to the double bond in a cyclohexene ring insofar as configuration of the structure is considered:

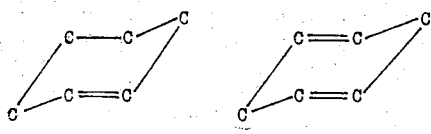

I have now unexpectedly found that a nonconjugated cyclohexadiene such as 1,4-cyclohexadiene will enter into a Diels-Alder reaction when treated with a polyhalocycloalkadiene such as hexachlorocyclopentadiene to form a novel composition of matter. The reaction results in the formation of a reaction product which comprises a polyhalo-substituted methanonaphthalene when one molecular proportion of a polyhalocyclopentadiene is reacted with one molecular proportion of 1,4-cyclohexadiene, and a dimethanoanthracene when two molecular proportions of a polyhalocyclopentadiene are reacted with one molecular proportion of 1,4-cyclohexadiene. This result is totally unexpected inasmuch as the prior art has, as hereinbefore set forth, indicated that cyclohexadiene will not act as a dienophile and undergo a Diels-Alder reaction with hexachlorocyclopentadiene.

It is therefore an object of this invention to prepare new compositions of matter comprising polyhalo-substituted polycyclic compounds.

A further object of this invention is to prepare new compositions of matter useful as insecticides by condensing a conjugated polyhalocycloalkadiene such as hexachlorocyclopentadiene with a non-conjugated cycloalkadiene such as 1,4-cyclohexadiene.

One embodiment of this invention resides in a process for the preparation of polyhalo-substituted polycyclic compounds by reacting a conjugated polyhalocycloalkadiene with a non-conjugated cycloalkadiene, and recovering the resultant polyhalo-substituted polycyclic compounds.

A specific embodiment of the invention resides in a process for the preparation of a polychloro-substituted polycyclic compound which comprises condensing one molecular proportion of hexachlorocyclopentadiene with one molecular proportion of 1,4-cyclohexadiene, and recovering the resultant 1,2,3,4,9,9-hexachloro-1,4,4a,5,8,-8a-hexahydro-1,4-methanonaphthalene.

Another specific embodiment of the invention resides in a process for the preparation of a polychloro-substituted polycyclic compound which comprises condensing two molecular proportions of hexachlorocyclopentadiene with one molecular proportion of 1,4-cyclohexadiene, and recovering the resultant 1,2,3,4,5,6,7,8,11,11,12,12-dodecachloro - 1,4,4a,5,8,8a,9,9a,10,10a - decahydro - 1,4,5,8-dimethanoanthracene.

A more specific embodiment of the invention resides in a process for the preparation of a polychloro-substituted anthracene which comprises condensing two molecular proportions of hexachlorocyclopentadiene with one molecular proportion of 1,4-cyclohexadiene in the presence of toluene at a temperature in the range of from about 100° to about 120° C., and recovering the resultant 1,2,3,4,5,6,7,8,11,11,12,12 - dodecachloro - 1,4,-4a,5,8,8a,9,9a,10,10a - decahydro - 1,4,5,8 - dimethanoanthracene.

Another specific embodiment of the invention resides in a method of controlling pestiologically active organisms which comprises treating said organisms with 1,2,3,4,9,9, - hexachloro - 1,4,4a,5,8,8a-hexahydro - 1,4-methanonaphthalene.

Yet another specific embodiment of the invention resides in a method of controlling pestiologically active organisms which comprises treating said organisms with 1,2,3,4,5,6,7,8,11,11,12,12 - dodecachloro - 1,4,4a,5,8,8a,-9,9a,10,10a-decahydro-1,4,5,8-dimethanoanthracene.

Still another specific embodiment of the invention resides in a new composition of matter comprising 1,2,3,4,-9,9a - hexachloro - 1,4,4a,5,8,8a-hexahydro-1,4-methanonaphthalene.

Yet another more specific embodiment of the invention resides in a new composition of matter comprising 1,2,3,4,5,6,7,8,11,11,12,12 - dodecachloro - 1,4,4a,5,8,8a,9, 9a,10,10a-decahydro-1,4,5,8-dimethanoanthracene.

Other objects and embodiments of this invention referring to alternative polyhalocycloalkadienes and to alternative non-conjugated cycloalkadienes which may be used in the process of the present invention will be set forth in greater detail in the following further description of this invention.

As hereinbefore set forth it has now been discovered that new compositions of matter comprising the condensation products of a non-conjugated cycloalkadiene and a polyhalocycloalkadiene may be prepared by heating the aforesaid compounds with or without the presence of an inert diluent. These new compositions of matter, particularly those which comprise the condensation products of hexachlorocyclopentadiene and 1,4-cyclohexadiene are useful as insecticides, being particularly effective against houseflies, and also as intermediates in the preparation of other organic compounds. The 1,2,3,4,9,9-hexachloro-1,4,4a,5,8,8a-hexahydro-1,4-methanonaphthalene may, for example, be treated with peracetic acid, perbenzoic acid, hydrogen peroxide plus sulfuric acid, or other epoxidation agent to obtain 1,2,3,4,9,9-hexachloro-6,7-epoxy-1,4,4a,5,8,8a-hexahydro-1,4-methanonaphthalene, a powerful insecticide. Further, addition of halogen or hydrogen halide to the hexachlorohexahydromethanonaphthalene will yield polyhalo derivatives such as 1,2,3,4,6,9,9-heptachloro- and 1,2,3,4,6,7,9,9-octachloro-1,4,4a,5,8,8a-hexahydro-1,4-methanonaphthalene.

The polyhalocycloalkadienes which are used in the process of this invention are selected from polyhalo-1,3-cyclopentadienes and preferably comprise hexachlorocyclopentadiene, although other chloro- or bromo-substituted cyclopentadienes such as dichlorocyclopentadiene, trichlorocyclopentadiene, tetrachlorocyclopentadiene, pentachlorocyclopentadiene, dibromocyclopentadiene, tribromocyclopentadiene, hexabromocyclopentadiene, bromopentachlorocyclopentadiene, etc. may also be used, although not necessarily with equivalent results. The term, cyclopentadiene, as used in this specification and claims refers to the 1,3-isomer. The non-conjugated cycloalkadienes which are condensed with the polyhalocycloalkadienes in the present invention are selected from the 1,4-cyclohexadienes, 1,4-cycloheptadienes, 1,4-cyclooctadienes, 1,5-cyclooctadienes, etc., the preferred non-conjugated cycloalkadienes being the 1,4-cyclohexadienes including 1,4-cyclohexadiene; alkyl-1,4-cyclohexadienes such as 1-methyl-1,4-cyclohexadiene, 1-ethyl-1,4-cyclohexadiene, 1-propyl-1,4-cyclohexadiene, 1,2-dimethyl-1,4-cyclohexadiene, 1,2-diethyl-1,4-cyclohexadiene, 1,2,3-trimethyl-1,4-cyclohexadiene, etc.; halo-substituted 1,4-cyclohexadienes such as 1-chloro-1,4-cyclohexadiene, 1-bromo-1,4-cyclohexadiene, 1-fluoro-1,4-cyclohexadiene, 1,2-dichloro-1,4-cyclohexadiene, 1,2,3-trichloro-1,4-cyclohexadiene, 1,2-dibromo-1,4-cyclohexadiene, 1,2-difluoro-1,4-cyclohexadiene, etc. It is to be understood that the above mentioned polyhalocycloalkadienes and non-conjugated cycloalkadienes are only representatives of the class of compounds which may be used in the process of the present invention, and that said process is not necessarily limited thereto.

The product of the condensation of one molecular proportion of hexachlorocyclopentadiene and one molecular proportion of 1,4-cyclohexadiene, said compounds being used as examples of the process of this invention, results in a polychloro-substituted naphthalene which is 1,2,3,4,9,9-hexachloro-1,4,4a,5,8,8a - hexahydro - 1,4 - methanonaphthalene having the formula:

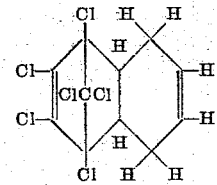

The product of the condensation of two molecular proportions of hexachlorocyclopentadiene and one molecular proportion of 1,4-cyclohexadiene, said compounds being used as examples of the process of this invention, results in a polychloro-substituted anthracene which is 1,2,3,4,5,6,7,8,11,11,12,12 - dodecachloro - 1,4,4a,5,8,8a, 9,9a,10,10a-decahydro-1,4,5,8-dimethanoanthracene having the general formula:

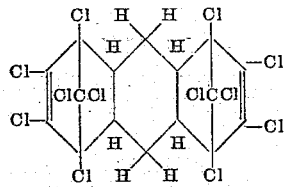

The process of this invention is effected at elevated temperatures, suitable temperatures being in the range of from about 40° to about 200° C. or more, a preferred range being from about 80° to about 140° C. In addition it is also contemplated that, if the reaction is effected at higher temperatures superatmospheric pressures ranging from about 2 to about 100 atmospheres or more may be used, the pressure being sufficient to maintain at least a portion of the reactants in the liquid phase. If so desired, the reaction may be carried out in the presence of an inert organic diluent including aromatic hydrocarbons such as benzene, toluene, the xylenes, ethylbenzene, etc.; paraffinic hydrocarbons such as pentane, hexane, heptane, octane, etc.; saturated cyclic hydrocarbons such as cyclopentane, cyclohexane, cycloheptane, methylcyclopentane, ethylcyclopentane, etc.; alcohols such as methyl alcohol, ethyl alcohol, propyl alcohol, isopropyl alcohol, etc.; ethers such as dimethyl ether, diethyl ether, dipropyl ether, etc.; or acetone, acetic acid, etc.

The process of this invention may be effected in any suitable manner and may comprise either a batch or continuous type operation. When a batch type operation is used, a quantity of the starting material, namely, the polyhalocycloalkadiene and the non-conjugated cycloalkadiene along with an inert diluent, if so desired, are placed in an appropriate condensation apparatus such as a flask, provided with heating and refluxing means. The reaction vessel is then heated to the desired temperature and maintained thereat for a predetermined period of time. At the end of this desired residence time which may be from about 0.5 to about 12 hours, the reaction vessel and contents thereof is cooled to room temperature and the reaction product separated from any unreacted starting materials and by-products by conventional means such as fractional distillation, crystallization, etc.

The product of this invention may also be prepared by a continuous type process wherein the reactants are continuously charged to a reaction vessel maintained at the proper operating conditions of temperature and pressure. After the desired residence time in the reaction, a product stream is continuously withdrawn therefrom, the condensation product being then separated from any unreacted starting materials, diluent and/or side reaction products which may have formed, and purified by conventional means, as hereinbefore set forth, while the unreacted compounds are recycled for further use as a portion of the feed material.

The physical properties of the present polyhalo-substituted polycyclic condensation products and the effects they have on entomological forms of life make them particularly desirable as insecticides and insect repellents, the compounds having many of the features desired of materials for this purpose. They are, for example, toxic to insects which are destructive of plant life and property normally subject to insect infestation, their toxic effects being manifested by contact of the poison with the insect. The insecticides comprising the present compounds are thus effective against chewing as well as sucking types of insects. The compounds are sufficiently volatile such that when applied to plant life intended for subsequent human consumption, the plant when harvested and after allowing a reasonable time for evaporation of the applied insecticide therefrom retain none of the toxicant to prevent use of the plant for food purposes. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water or combined with an oil and emulsified with water by the addition of an emulsifying agent, such as a surface active agent, to the mixture of components. The latter solvents and dispersants may also be employed for the specific purpose of reducing the concentration of insecticide to the desired level in a specific insecticide formulation. The particular formulation of active components in combination with the solvent or dispersant will depend upon its application. Compositions containing as high as 20% of active component may be preferred in some instances where deep penetration of the insecticide is desired, as in the treatment of fibrous material such as wood for extinction of a particular infestation, such as wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as butane, Freon, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, etc., and the resulting solution atomized by a suitable spraying device.

The following examples are given to illustrate the process of the present invention, which, however, are not intended to limit the generally broad scope of the present invention in strict accordance therewith.

*Example I*

A solution of 2 g. of 1,4-cyclohexadiene and 5 g. of hexachlorocyclopentadiene in 4.5 g. of an inert diluent comprising toluene was heated under reflux at a temperature of approximately 113–114° C. for a period of 10 hours. At the end of this time the vessel and contents thereof was allowed to cool to room temperature and the reaction products subjected to fractional distillation under reduced pressure. The toluene was distilled off and the reaction product comprised a solid residue. This residue was recrystallized from ethyl alcohol to form crystals of 1,2,3,4,5,6,7,8,11,11,12,12 - dodecachloro - 1,4,4a,5,8,8a, 9,9a,10,10a-decahydro-1,4,5,8 - dimethanoanthracene, the melting point of said crystals being over 300° C. These crystals were analyzed with the following results:

Found: C, 31.07; H, 1.58; Cl, 67.07; Ash 0.92. Calculated for: $C_{16}H_8Cl_{12}$: C, 30.71; H, 1.29; Cl, 68.00.

By carrying out the reaction in the presence of a large excess of 1,4-cyclohexadiene (e.g. 6 g. in the above experiment) the tendency to form the condensation product of two molecular proportions of hexachlorocyclopentadiene with one of a 1,4-cyclohexadiene (i.e., the dodecachlorodecahydrodimethanoanthracene) is decreased and the chief product is 1,2,3,4,9,9-hexachloro-1,4,4a,5,8,8a-hexahydro-1,4-methanonaphthalene.

*Example II*

A mixture of 7 g. (0.025 mole) of hexachlorocyclopentadiene and 8 g. (0.1 mole) of 1,4-cyclohexadiene was heated under reflux at 98–100° C. for a period of about 7 hours. At the end of this time the vessel and contents thereof was allowed to cool to room temperature and the reaction product subjected to fractional distillation under reduced pressure (0.1 mm.), to yield 6 g. of a material boiling below 30° C. at 1.0 mm. pressure (below about 200° C. at atmospheric pressure), consisting of unreacted cyclohexadiene together with 1.4 g. of a material boiling at 47–48° C. and comprising unreacted hexachlorocyclopentadiene. The residue from the fractional distillation consisted of 3.3 g. of amber crystals and oil. During the distillation, crystalline material sublimed into the fractionating column, said material being removed by refluxing alcohol through the distillation column. The alcoholic solution when cooled yielded a small amount of white needles which melted above 300° C. and consisted of the reaction product of 2 moles of hexachlorocyclopentadiene with 1 mole of 1,4-cyclohexadiene, the same material which was obtained in Example I. The mother liquor upon concentration yielded white nacreous flakes melting at 70–71° C., consisting of the reaction product of 1 mole of hexachlorocyclopentadiene with 1 mole of 1,4-cyclohexadiene. The residue described above consisting of the amber crystals and oil was treated with n-pentane leaving a minor amount of undissolved brown powder melting above 300° C. The n-pentane solution on concentration and cooling yielded a crystalline material melting at 70–71° C.

That the crystals melting at 70–71° C. comprised 1,2,3,4,9,9 - hexachloro - 1,4,4a,5,8,8a - hexahydro - 1,4-methanonaphthalene, was shown by their analysis:

Found: C, 37.21; H, 2.44; Cl, 60.46. Calculated for: $C_{11}H_8Cl_6$: C, 37.44; H, 2.28; Cl, 60.28.

*Example III*

An insecticidal composition is prepared by dissolving 1 g. of 1,2,3,4,9,9-hexachloro-1,4,4a,5,8,8a-hexahydro-1,4-methanonaphthalene in 2 cc. of benzene and adding 100 cc. of water using Triton X–100 as an emulsifying agent. This solution is sprayed into a cage containing common houseflies and causes a 100% knock-down.

I claim as my invention:

1. A process for the preparation of a polyhalo-substituted polycyclic compound which comprises reacting a conjugated polyhalocycloalkadiene with a non-conjugated monocyclic cycloalkadiene, and recovering the resultant polyhalo-substituted polycyclic compound.

2. A process for the preparation of a polyhalopolycyclic compound which comprises condensing a conjugated polyhalocycloalkadiene with a non-conjugated monocyclic cycloalkadiene in the presence of an inert diluent, and recovering the resultant polyhalo-substituted polycyclic compound.

3. A process for the preparation of a polychloro-substituted polycyclic compound which comprises condensing a conjugated polychlorocycloalkadiene with a non-conjugated monocyclic cycloalkadiene, and recovering the resultant polychloro-substituted polycyclic compound.

4. A process for the preparation of a polychloro-substituted polycyclic compound which comprises condensing one molecular proportion of a polychlorocyclopentadiene with one molecular proportion of a non-conjugated monocyclic cycloalkadiene, and recovering the resultant polychloro-substituted polycyclic compound.

5. A process for the preparation of a hexachloro-substituted polycyclic compound which comprises condensing one molecular proportion of hexachlorocyclopentadiene with one molecular proportion of a non-conjugated cyclohexadiene, and recovering the resultant hexachloro-substituted methanonaphthalene.

6. A process for the preparation of a polychloro-substituted polycyclic compound which comprises condensing one molecular proportion of hexachlorocyclopentadiene with one molecular proportion of 1,4-cyclohexadiene, and recovering the resultant 1,2,3,4,9,9-hexachloro - 1,4,4a,5,8,8a - hexahydro - 1,4 - methanonaphthalene.

7. A process for the preparation of a polychloro-substituted polycyclic compound which comprises condensing two molecular proportions of a polychlorocyclopentadiene with one molecular proportion of a non-conjugated monocyclic cycloalkadiene, and recovering the resultant polychloro-substituted polycyclic compound.

8. A process for the preparation of a hexachloro-substituted polycyclic compound which comprises condensing two molecular proportions of hexachlorocyclopentadiene with one molecular proportion of a non-conjugated cyclohexadiene, and recovering the resultant hexachloro-substituted dimethanoanthracene.

9. A process for the preparation of a polychloro-substituted polycyclic compound which comprises condensing two molecular proportions of hexachlorocyclopentadiene with one molecular proportion of 1,4-cyclohexadiene in the presence of an inert diluent, and recovering the resultant 1,2,3,4,5,6,7,8,11,11,12,12-dodecachloro-1,4,4a,5,8,8a,9,9a,10,10a - decahydro-1,4,5,8,-dimethanoanthracene.

10. A process for the preparation of a polychloro-substituted polycyclic compound which comprises condensing one molecular proportion of hexachlorocyclopentadiene with one molecular proportion of 1,4-cyclohexadiene in the presence of toluene, and recovering the resultant 1,2,3,4,9,9-hexachloro-1,4,4a,5,8,8a-hexahydro-1,4-methanonaphthalene.

11. A process for the preparation of a polychloro-substituted polycyclic compound which comprises condensing two molecular proportions of hexachlorocyclopentadiene with one molecular proportion of 1,4-cyclohexadiene in the presence of toluene, and recovering the resultant 1,2,3,4,5,6,7,8,11,11,12,12-dodecachloro-1,4,4a,5,8,8a,9,9a,10,10a - decahydro - 1,4,5,8-dimethanoanthracene.

12. A process for the preparation of a polychloro-substituted polycyclic compound which comprises condensing two molecular proportions of hexachlorocyclopentadiene with one molecular proportion of 1,4-cyclohexadiene at a temperature in the range of from about 40° to about 200° C., and recovering the resultant 1,2,3,4,5,6,7,8,11,11,12,12-dodecachloro - 1,4,4a,5,8,8a,9,9a,10,10a-octahydro-1,4,5,8-dimethanoanthracene.

13. A process for the preparation of a polychloro-substituted polycyclic compound which comprises condensing two molecular proportions of hexachlorocyclopentadiene with one molecular proportion of 1,4-cyclohexadiene in the presence of toluene at a temperature in the range of from about 100° to about 120° C., and recovering the resultant 1,2,3,4,5,6,7,8,11,11,12,12-dodecachloro-1,4,4a,5,8,8a,9,9a,10,10a-octahydro-1,4,5,8-dimethanoanthracene.

14. A process for the preparation of a polychloro-substituted polycyclic compound which comprises condensing one molecular proportion of hexachlorocyclopentadiene with one molecular proportion of 1,4-cyclohexadiene in the presence of toluene at a temperature in the range of from about 40° to about 200° C., and recovering the resultant 1,2,3,4,9,9 - hexachloro - 1,4,4a,5,8,8a-hexahydro-1,4-methanonaphthalene.

15. A polychloro-substituted polycyclic compound resulting from the condensation of a polychlorocyclopentadiene and a non-conjugated cycloalkadiene.

16. 1,2,3,4,9,9 - hexachloro - 1,4,4a,5,8,8a-hexahydro-1,4-methanonaphthalene resulting from the condensation of equimolecular proportions of hexachlorocyclopentadiene and 1,4-cyclohexadiene.

17. 1,2,3,4,5,6,7,8,11,11,12,12 - dodecachloro - 1,4,4a,5,8,8a,9,9a,10,10a - decahydro - 1,4,5,8 - dimethanoanthracene resulting from the condensation of two molecular proportions of hexachlorocyclopentadiene with one molecular proportion of 1,4-cyclohexadiene.

18. An insecticidal composition comprising a liquid carrier containing 1,2,3,4,9,9 - hexachloro-1,4,4a,5,8,8a-hexahydro-1,4 - methanonaphthalene resulting from the condensation of equimolecular proportions of hexachlorocyclopentadiene and 1,4-cyclohexadiene.

19. An insecticidal composition comprising a liquid carrier containing 1,2,3,4,5,6,7,8,11,11,12,12 - dodecachloro - 1,4,4a,5,8,8a,9,9a,10,10a - decahydro - 1,4,5,8-dimethanoanthracene resulting from the condensation of two molecular proportions of hexachlorocyclopentadiene with one molecular proportion of 1,4-cyclohexadiene.

References Cited in the file of this patent

UNITED STATES PATENTS

| | | |
|---|---|---|
| 2,635,977 | Lidov | Apr. 21, 1953 |
| 2,676,132 | Bluestone | Apr. 20, 1954 |

OTHER REFERENCES

Ziegler et al.: "Annalen der Chemie," vol. 589, pp. 157–162 (1954).